(12) United States Patent
Hultell et al.

(10) Patent No.: US 8,730,922 B2
(45) Date of Patent: May 20, 2014

(54) METHODS AND DEVICES FOR UPLINK TRANSMIT DIVERSITY

(75) Inventors: Johan Hultell, Solna (SE); Johan Bergman, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 478 days.

(21) Appl. No.: 13/010,135

(22) Filed: Jan. 20, 2011

(65) Prior Publication Data

US 2011/0176593 A1 Jul. 21, 2011

Related U.S. Application Data

(60) Provisional application No. 61/296,595, filed on Jan. 20, 2010, provisional application No. 61/299,411, filed on Jan. 29, 2010.

(51) Int. Cl.
*H04W 4/00* (2009.01)

(52) U.S. Cl.
USPC ............................ 370/334; 370/329; 370/341

(58) Field of Classification Search
None
See application file for complete search history.

(56) References Cited

U.S. PATENT DOCUMENTS

| | | | |
|---|---|---|---|
| 2007/0142074 A1 | 6/2007 | Black et al. | |
| 2010/0048214 A1* | 2/2010 | Usuda et al. | 455/442 |
| 2011/0080972 A1* | 4/2011 | Xi et al. | 375/267 |

FOREIGN PATENT DOCUMENTS

| | | |
|---|---|---|
| EP | 1 833 268 A1 | 9/2007 |
| WO | WO 2008/113725 | 9/2008 |
| WO | WO 2009/133805 | 11/2009 |

OTHER PUBLICATIONS

WO/2006/064806: Wireless Line Control Station, Base Station, Mobile Station, Mobile Communication System and Mobile Communication Method; Published Jun. 22, 2006.*
International Search Report and Written Opinion of the International Search Authority mailed May 27, 2011 in corresponding Application No. PCT/SE2011/050004.

* cited by examiner

*Primary Examiner* — Derrick Ferris
*Assistant Examiner* — Kodzovi Acolatse
(74) *Attorney, Agent, or Firm* — Nixon & Vanderhye P.C.

(57) ABSTRACT

Methods and devices are described for use in a wireless communications system supporting uplink transmit diversity. If it is detected that a user equipment is currently in one of a predetermined set of situations, a set of restrictions associated with the detected situation is applied when the user equipment changes pre-coding weights. The set of restrictions limits how much the pre-coding weights can be changed. A user equipment in soft handover may also be restricted to only consider feedback information from a serving base station when selecting pre-coding weights. Thus it is possible to ensure that pre-coding weights are carefully selected in situations where there is a high risk for detrimental interference and/or inferior uplink/downlink performance. A network node may be configured to detect such a situation and notify the user equipment of any restrictions to be applied on the pre-coding weight selection.

10 Claims, 5 Drawing Sheets

METHODS AND DEVICES FOR UPLINK TRANSMIT DIVERSITY

This application claims priority to Provisional Application No(s). 61/296,595, filed 20 Jan. 2010 and 61/299,411, filed 29 Jan. 2010, the entire contents of each of which are hereby incorporated by reference.

TECHNICAL FIELD

The present invention relates to uplink transmit diversity in a wireless communications system, and in particular to methods and devices that make it possible to avoid inferior uplink and/or downlink performance in some situations of uplink transmit diversity.

BACKGROUND

Currently the Third Generation Partnership Project (3GPP) is evaluating the potential benefits of uplink transmit (Tx) diversity in the context of High-Speed Uplink Packet Access (HSUPA). With uplink transmit diversity user equipments (UEs) that are equipped with two or more transmit antennas are capable of utilizing all of them for uplink transmissions. A fundamental idea behind uplink transmit diversity is to exploit variations in the effective channel to improve user and network performance. The term effective channel here incorporates the combined effect of far-field pattern(s) of transmitting antenna(s), the antenna pattern associated with receiving antenna(s), as well as the wireless channel between transmitting and receiving antenna(s). This is achieved by multiplying a UE output signal s(t) with a set of complex pre-coding weights $w_i$, where i=1 ... N with N denoting the number of transmit antennas. Pre-coding weights are often also referred to as antenna weights. The terms "pre-coding weight" and "antenna weight" are used interchangeably herein.

By using uplink transmit diversity the antenna weights used by the UE may be adapted in such a way that user and/or network performance is maximized. Depending on UE implementation the antenna weights may be associated with different constraints. Within 3GPP two classes of transmit diversity are considered:

Switched antenna diversity, where the UE at any given time-instance transmits from one of its antennas only. Thus if $w_i \neq 0$, $w_j = 0$ for all $j \neq i$.

Beam forming where the UE at a given time-instance can transmit from more than one antenna simultaneously. By means of beam forming it is possible to shape an overall antenna beam in the direction of a target receiver.

While switched antenna diversity can be applied for UE implementations with a single power amplifier (PA) the beam forming solutions may require one PA for each transmit antenna.

Switched antenna diversity can be seen as a special case of beam forming where one of the antenna weights is 1 (i.e. switched on) and the antenna weight of any other antenna of the UE is 0 (i.e. switched off).

Selection of appropriate antenna weights is crucial in order to be able to exploit the variations in the effective channel constructively. Furthermore timing of changes in antenna weights is important. When the antenna weights changes the effective channel as perceived by a receiving base station, such as a Node-B, may change abruptly. For instance, in a case of switched antenna diversity with two antennas, if a UE starts transmitting from antenna 2 instead of antenna 1 then the corresponding antenna weights $w_1/w_2$ will change from 1/0 to 0/1 in an instant. As a result previous channel estimates become out of date, which may lead to worse effective signal-to-interference ratio (SIR) at the Node-B and packet errors until channel estimates have been updated and the Node-B has adjusted its channel estimates to reflect the new channel.

Irrespective of whether switched antenna diversity or beam forming is considered, the selection of antenna weights could be based on that a serving Node-B provides explicit feedback to the UE specifying the weights that should be used. This would require a feedback channel for the feedback specifying the weights. Another approach is to let the UE autonomously decide which antenna weights to apply. The selection of antenna weights could for example be based on evaluations of feedback transmitted for other purposes, such as Transmission Power Control (TPC) commands received on the feedback channel F-DPCH (Fractional Dedicated Physical Channel).

It has been decided in 3GPP, as mentioned in 3GPP Tdoc RP-090987, 3GPP Work Item Description: Uplink Tx Diversity for HSPA, to investigate uplink transmit diversity techniques for HSPA that do not require any newly standardised dynamic feedback signaling between network and UE. According to some suggested schemes the UE should monitor the TPC commands received on the feedback channel F-DPCH to select antenna weights. The F-DPCH is an already existing feedback channel and TPC commands is feedback information that is already transmitted for purposes of uplink transmit power control. For example, if a UE operating with switched antenna diversity receives a large number of consecutive TPC UP commands on F-DPCH from the serving cell, the UE may conclude that it is likely to be beneficial to switch to another antenna for transmission.

In 3GPP focus has been on uplink transmit diversity schemes where the UE autonomously select antenna weights. A consequence of this is that the Node-B neither is aware of that a change in antenna weights has occurred nor the method that the UE applies for choosing antenna weights. The schemes considered in 3GPP so far have only been based on the TPC commands, or combined TPC when the UE is in soft handover (SHO), when deciding antenna weights.

As mentioned above selection of appropriate pre-coding weights is crucial and may have an impact not only on uplink and/or downlink performance associated with the UE selecting the antenna weights, but also on uplink and/or downlink performance associated with other UEs and Node-Bs due to interference. It is therefore important to select the pre-coding weights carefully.

SUMMARY

An object of the present invention is to provide methods and devices that allow for selection of appropriate pre-coding weights for uplink transmit diversity.

The above stated object is achieved by means of methods, user equipments and network nodes according to the independent claims.

A first embodiment provides a method for uplink transmit diversity in a user equipment of a wireless communications system. According to the method uplink transmission is performed using a first set of pre-coding weights. Thereafter an updated set of pre-coding weights is selected for continuing the uplink transmission. The selection of the updated set of pre-coding weights includes detecting if the user equipment is currently in one of a predetermined set of situations. If the user equipment is detected to be in one of the predetermined set of situations a set of restrictions associated with the detected situation is applied when selecting the updated set of pre-coding weights. The set of restrictions limits an amount of change between pre-coding weights of the updated set of pre-coding weights and previous pre-coding weights applied for the uplink transmission. In a further step of the method uplink transmission is performed using the selected updated set of pre-coding weights.

A second embodiment provides a user equipment for use in a wireless communications system supporting uplink transmit diversity. The user equipment comprises a plurality of antennas for uplink and downlink transmission. The user equipment is configured to perform uplink transmission using a first set of pre-coding weights. The user equipment is further configured to select an updated set of pre-coding weights for continuing the uplink transmission. The user equipment is configured to select the updated set of pre-coding weights by detecting if the user equipment is currently in one of a pre-determined set of situations. If the user equipment is detected to be in one of the predetermined set of situations, the user equipment is configured to apply a set of restrictions associated with the detected situation when selecting the updated set of pre-coding weights. The set of restrictions limits an amount of change between pre-coding weights of the updated set of pre-coding weights and previous pre-coding weights applied for the uplink transmission. The user equipment is also configured to perform uplink transmission using the selected updated set of pre-coding weights.

A third embodiment provides a method in a network node of a wireless communications system for supporting uplink transmit diversity in a user equipment of the wireless communications system. According to the method it is detected if the user equipment is currently in one of a predetermined set of situations. If the user equipment is detected to be in one of the predetermined set of situations a message is sent to the user equipment to notify the user equipment to apply a set of restrictions associated with the detected situation when selecting an updated set of pre-coding weights for uplink transmission. The set of restrictions limits an amount of change between pre-coding weights of the updated set of pre-coding weights and previous pre-coding weights applied for the uplink transmission.

A fourth embodiment provides a network node for use in a wireless communications system supporting uplink transmit diversity. The network node is configured to detect if a user equipment of the wireless communication system is currently in one of a predetermined set of situations. If it is detected that the user equipment is in one of the predetermined set of situations, the network node is configured to send a message to the user equipment to notify the user equipment to apply a set of restrictions associated with the detected situation when selecting an updated set of pre-coding weights for uplink transmission. The set of restrictions limits an amount of change between pre-coding weights of the updated set of pre-coding weights and previous pre-coding weights applied for the uplink transmission.

A fifth embodiment provides a method for uplink transmit diversity in a user equipment, which is in a soft handover state and is in communication with a serving base station and a number of non-serving base stations. According to the method uplink transmission using a first set of pre-coding weights is performed. In a further step of the method feedback information is received from the serving base station and at least one of the number of non-serving base stations. In another step an updated set of pre-coding weights is selected for continuing the uplink transmission. The selection of the set of updated pre-coding weights is based on the received feedback information. If it is detected that the user equipment is currently in one of a predetermined set of situations, only the feedback information that has been received from the serving base station is considered when selecting the updated set of pre-coding weights. In yet another step of the method uplink transmission is performed using the selected updated set of pre-coding weights.

A sixth embodiment provides a user equipment for use in a wireless communications system supporting uplink transmit diversity. The user equipment comprises a plurality of antennas for uplink and downlink transmission. The user equipment is configured to, when being in a soft handover state, communicate with a serving base station and a number of non-serving base stations. The user equipment is also configured to perform uplink transmission using a first set of pre-coding weights and to receive feedback information from the serving base station and at least one of the number of non-serving base stations. The user equipment is further configured to select an updated set of pre-coding weights for continuing the uplink transmission based on the received feedback information and to detecting if the user equipment is currently in one of a predetermined set of situations. If the user equipment is detected to be in one of the predetermined set of situations, the user equipment is configured to only consider the feedback information that has been received from the serving base station when selecting the updated set of pre-coding weights. In addition, the user equipment is configured to perform uplink transmission using the selected updated set of pre-coding weights.

A seventh embodiment provides a method in a network node of a wireless communications system for supporting uplink transmit diversity in a user equipment, which is in a soft handover state and is receiving feedback information from a serving base station and a number of non-serving base stations. According to the method it is detected if the user equipment is currently in one of a predetermined set of situations. If the user equipment is detected to be in one of the predetermined set of situations, a message is sent to the user equipment to notify the user equipment to only consider the feedback information that has been received from the serving base station when selecting an updated set of pre-coding weights for uplink transmission.

An eighth embodiment provides a network node for use in a wireless communications system that supports uplink transmit diversity. The network node is configured to detect if a user equipment, which is in a soft handover state and receives feedback information from a serving base station and a number of non-serving base stations, is currently in one of a predetermined set of situations. If the user equipment is detected to be in one of the predetermined set of situations, the network node is configured to send a message to the user equipment to notify the user equipment to only consider the feedback information that has been received from the serving base station when selecting an updated set of pre-coding weights for uplink transmission.

An advantage of embodiments described above is that they allow detection of predetermined situations of a UE applying uplink transmit diversity and triggering of a pre-coding weight selection procedure in the UE that is adapted to the detected situation. Accordingly some embodiments of the invention make it possible to avoid using pre-coding weights that could lead to inferior uplink and/or downlink performance.

Another advantage is that the embodiments above may be used in connection with different uplink transmit diversity techniques. Examples of different uplink transmit diversity techniques are switched antenna transmit diversity and beam forming.

Further advantages and features of embodiments of the present invention will become apparent when reading the following detailed description in conjunction with the drawings.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

As used herein the term "antenna" is interchangeable with the term "antenna element". Therefore when referring herein to a user equipment with multiple antennas this includes user equipment's with a multiple element antenna arrangement.

Some of the embodiments described herein are described in connection with a NodeB. NodeB is a base station or radio base station in WCDMA/HSPA (Wideband Code Division Multiple Access/High-Speed Packet Access). However the present invention is not limited to WCDMA/HSPA. Embodiments of the present invention are also applicable for LTE (Long-Term Evolution). The base station is in LTE referred to as an eNodeB.

Figure 1:
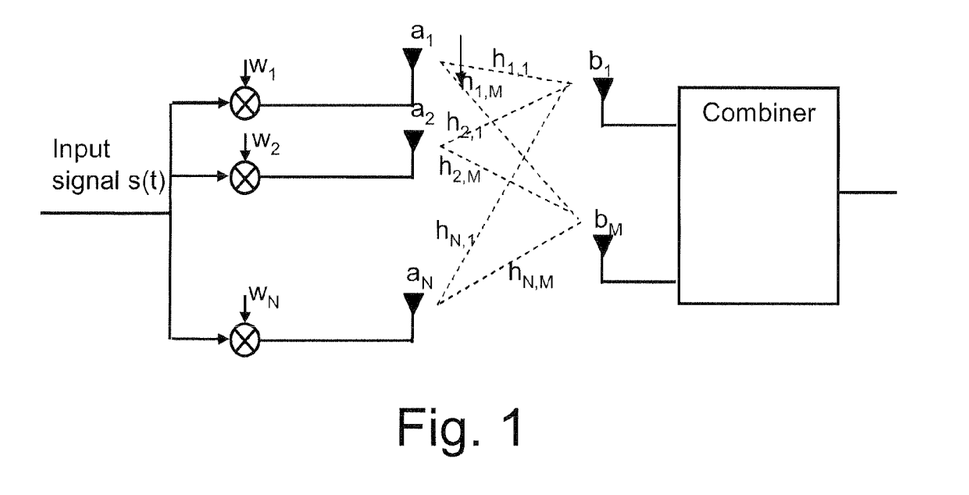
FIG. 1 is a schematic block diagram illustrating transmit diversity in general.

A general case of transmit diversity is illustrated in FIG. 1. An input signal s(t) is transmitted from transmit antennas $a_1, a_2, \ldots, a_N$ using transmission antenna weights $w_1, w_2, \ldots, w_N$. The transmissions from the transmit antennas $a_1, a_2, \ldots, a_N$ are received by receive antennas $b_1, \ldots, b_M$ and fed to a combiner. The paths or links between the respective transmit antennas and the respective receive antennas are denoted $h_{i,j}$, where $i=1, \ldots, N$ and $j=1, \ldots, M$.

Figure 2:
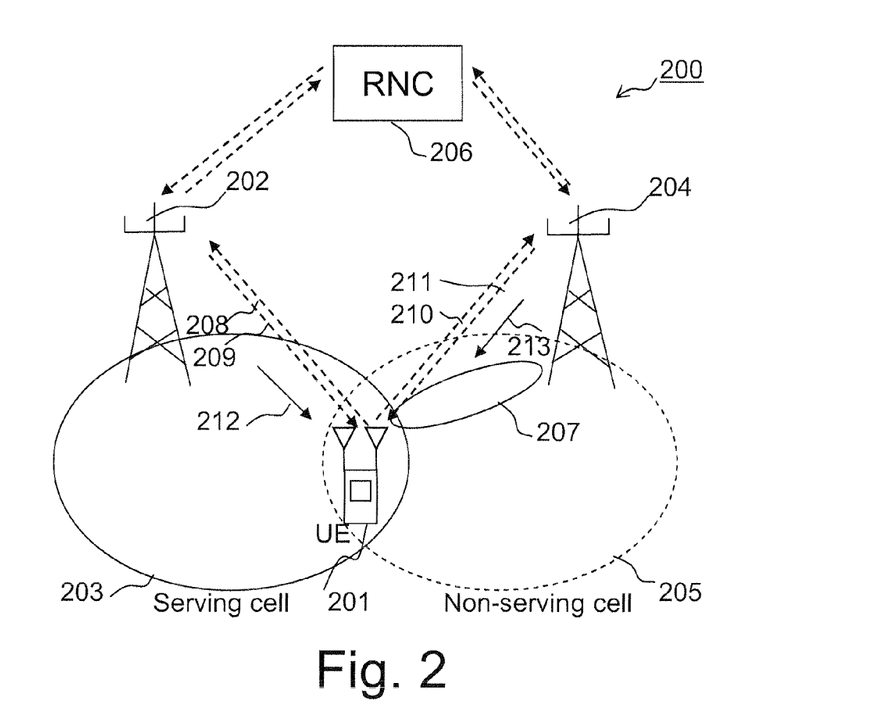
FIG. 2 is a schematic block diagram of a wireless communication system in which embodiments of the present invention may be implemented.

FIG. 2 illustrates an example of a wireless communication system 200, which supports uplink transmit diversity and in which embodiments of the present invention may be implemented. The exemplary wireless communication system 200 is a HSPA system. For the sake of simplicity, only those parts of the wireless communication system that are of particular relevance to the embodiments discussed herein are shown. The wireless communication system comprises a base station 202, i.e. a NodeB in this example, serving a UE 201 in a serving cell 203. The UE 201 is provided with a plurality of antennas to enable uplink transmit diversity. When the UE 201 is in a soft handover (SHO) state it communicates not only with the serving base station 202 but also with a number of non-serving base stations 204 in uplink. In FIG. 2 only one non-serving base station 204 and corresponding non-serving cell 205 are illustrated for simplicity, but it is to be understood that the UE 201 may communicate with a number of non-serving cells 205. The set of cells 203, 205 that the UE 201 is communicating with is referred to as an active set. A Radio Network Controller (RNC) 206 controls the base stations 202, 204 and determines based on measurements from the UE 201, the set of cells forming the active set of the UE 201. The UE is communicating with the serving base station 202 via a number of uplink channels 208 and a number of downlink channels 209, and with the non-serving base station 204 via a number of uplink channels 210 and a number of downlink channels 211. The uplink and downlink channels form respective links between the base stations 202, 204 and the UE 201.

In Enhanced Uplink, a scheduler in the NodeB 202 controls the transmission activity of different UEs. The UE 201 sends scheduling requests to the Node B 202 and the serving Node B sends scheduling grants 212 (also referred to as scheduled grants) in the form of absolute or relative grants to the UE 201 to control the data rate on an Enhanced Dedicated Channel (E-DCH). A serving grant is an internal variable in each UE that is used to track a maximum amount of resource the UE 201 is allowed to use on E-DCH Dedicated Physical Data Channel (E-DPDCH) transmissions. The NodeB 202 can update the serving grant in the UE 201 by sending a scheduling grant 212 to the UE 201 in the form of an absolute or a relative grant to the UE. A non-serving NodeB can reduce the serving grant of a UE by sending a relative grant overload indicator.

A larger scheduling grant 212 implies that the UE 201 may use a higher data rate but a higher data rate also results in more intra and inter-cell interference. The non-serving cells 205 does not issue any scheduling grants to its non-served UE 201 but can still impact the data rate of the UE 201 by transmitting an overload indicator 213 in the downlink 211 and thereby request the UE 201 to lower its E-DCH data rate (in other words its transmission power). This will reduce the interference level that the UE causes to the non-serving NodeB.

The inventors of the present invention have recognized that if UEs in soft handover (SHO) base their weight selection on the combined TPC as suggested in the schemes considered in 3GPP, the result could be that:

Both the serving and the non-serving cells experience a discontinuity in measured power when an abrupt change in the applied antenna weights occurs (e.g. when a change from [w1,w2]=[1.0] to [w1,w2]=[0.1] takes place).

When the UE is applying beam forming the UE steers its beam towards either the serving or a non-serving cell depending on which of them that is associated with the strongest effective channel, since this is the cell that will be power controlling the UE.

Considering the first issue outlined above, i.e. that an abrupt change in antenna weights will result in a power discontinuity, there are situations where antenna switching or large changes in applied pre-coding weights may be highly undesirable from a system performance point of view. One example of such a scenario is when a rise over thermal (RoT) level associated with a non-serving cell is high. In such contexts, an abrupt change in antenna weights can result in a rapid increase of the inter-cell interference measured by the surrounding Node-Bs. As non-serving cells, unlike the serving cells, lack the possibility of quickly reducing the UE transmit power by issuing a new scheduled grant 212 on a E-DCH Absolute Grant Channel (E-AGCH) such interference peaks could be very harmful.

Now consider the second issue outlined above, i.e. that it is possible for the UE to steer its beam 207 in different directions towards the serving base station 202 or the non-serving base station 204 by means of beam forming, i.e. by means of applying different pre-coding weights characterized by a relative phase difference. FIG. 2 illustrates a scenario in which the UE 201 has its beam 207 directed to the non-serving cell 205. In this scenario there is a risk that the link 208 is so weak so that the High-Speed Dedicated Physical Control Channel (HS-DPCCH) cannot be successfully decoded at the serving cell 203. This situation may arise since the UE 201 in soft handover receives F-DPCH transmit power control (TPC) feedback information from both the serving and the non-serving Node-Bs 202, 204. If the UE 201 does not distinguish between the feedback information from the different radio links 209, 211 it will, in this case, consider the feedback information (e.g. TPC commands) from all radio links 209, 211 when the pre-coding weights are updated. If the radio link 210, 211 towards the non-serving Node-B 204 is stronger than the link 208, 209 towards the serving Node-B 202 and the UE 201 update its pre-coding weights based on the TPC commands signaled over F-DPCH or ACK/NACK indications signaled over E-DCH Hybrid ARQ Indicator Channel (E-HICH), the UE 201 will adapt its pre-coding weights so that the signal strength at the non-serving Node-B 204 is maximized, while the Signal to Interference-plus-Noise Ratio (SINR) at the serving Node-B 202 is not considered. Note that this is similar to inner loop power control behavior for UEs in SHO, which adapt their transmit power so that a SINR target is met at the Node-B 202, 204 with strongest link. In other words the UE 201 directs its beam towards the non-serving Node-B 204. Simultaneous transmission from multiple antennas results in larger variations in the aggregate far-field antenna pattern compared to transmissions from a single antenna (this is the so-called beam-forming gain). This will thus result in an increased effective quality difference between the link towards the non-serving Node-B 204 and the link towards the serving Node-B 202. It is noticeable that a beam directed towards the non-serving cell 205 may be detrimental for several reasons:

- The HS-DPCCH is only decoded by the serving Node-B 202. As the HS-DPCCH is transmitted using a semi-static power offset configured via Radio Resource Control (RRC) with respect to the DPCCH power level, a "misdirected" beam can result in inferior HS-DPCCH coverage or alternatively that a significantly higher DPCCH Signal to Interference Ration (SIR) target is used by all cells in the active set. This will increase the overhead and lower the data rate.
- The beam 207 directed towards the non-serving cell 205 is only useful if sufficient hardware resources for decoding the E-DPDCH and other physical uplink channels have been allocated at the non-serving Node-B 204. If this is not the case, the outer loop power control (OLPC) would react by increasing the DPCCH SIR target for the cells in the active set until it is so high that at least one of the cells in the active set with sufficient hardware resources allocated can decode E-DPDCH. Aside from reducing the performance experienced by the user of the UE 201 this will also result in that surrounding cells in the system 200, in particular the non-serving cell 205 towards which the beam 207 is directed, experience an unnecessarily high interference level. This will in turn reduce the size of the grants that the cell 205 can schedule to UEs (not shown in FIG. 2) that have the cell 205 as their High-Speed Downlink Shared Channel (HS-DSCH) serving cell.

Accordingly to overcome the above mentioned problems, the situations where the problems arise, or might arise, are monitored according to embodiments described herein. If such a situation is detected pre-coding weights should be selected and updated carefully by the UE to avoid poor performance in the UE and to avoid causing interference that could be detrimental to other parts of the system. Embodiments presented herein allow UEs and/or the network nodes to detect and avoid using antenna weights that could lead to inferior uplink and/or downlink performance. Embodiments described herein are applicable to e.g. both single-carrier (SC) and multi-carrier (MC) High-Speed Uplink Access (HSUPA) systems. Here MC-HSUPA refers to a generalization of SC-HSUPA in which the UE is capable of transmitting on more than one uplink carrier simultaneously.

According to an exemplary embodiment a UE is restricted from making too abrupt changes in its antenna weights, such as e.g. switch transmit antenna when a predetermined situation is detected. For example, if the UE 201 in SHO has received an overload indication on E-DCH Relative Grant Channel (E-RGCH) it would be advantageous to ensure that the UE 201 does not switch antenna since this is likely to cause outage for the non-serving cell 205. There are different ways in which the UE may be restricted from making too abrupt or too frequent updates in its pre-coding weights. The predetermined situation(s) may be monitored and detected by the UE itself or by a network node, such as an RNC or base station. For example, if the UE reports an Event 1a, which is predefined by 3GPP and indicates detection of a strong neighbor cell that currently is not in the active set of the UE, the RNC could signal that the UE only is allowed to transmit from one of its antennas. Another example could be that the serving Node-B measures E-DPDCH and/or HS-DPCCH quality and when it detects an inferior performance for these channels transmit a Layer 1/Layer 2 (L1/L2) signal that e.g., informs the UE that it only should transmit from one antenna.

According to an alternative exemplary embodiment a UE in SHO is restricted to only consider feedback information, such as e.g., TPC commands, associated with the serving Node-B 202 when selecting antenna weights, if a predetermined situation has been detected. Thus the UE should not consider feedback information from any non-serving Node B 204 when selecting pre-coding weights. By only considering the feedback from the serving Node-B it could, for example, be ensured that UEs applying beam forming always direct their beam towards the serving Node-B. This may be beneficial for e.g. the HS-DPCCH coverage. The predetermined situation(s) may be monitored and detected by the UE itself or by a network node, such as an RNC or base station. For example, the serving Node-B 202 may measure E-DPDCH and/or HS-DPCCH quality and if it detects an inferior performance for these channels the serving Node-B 202 may transmit a L1/L2 signal, e.g., informing the UE 201 that it only should consider the feedback information from the serving Node-B when updating its pre-coding weights.

Additional exemplary embodiments may be based on combinations of different aspects of the above mentioned exemplary embodiments. There are exemplary embodiments that are applicable to both switched transmit diversity and beam forming.

Figure 3A:
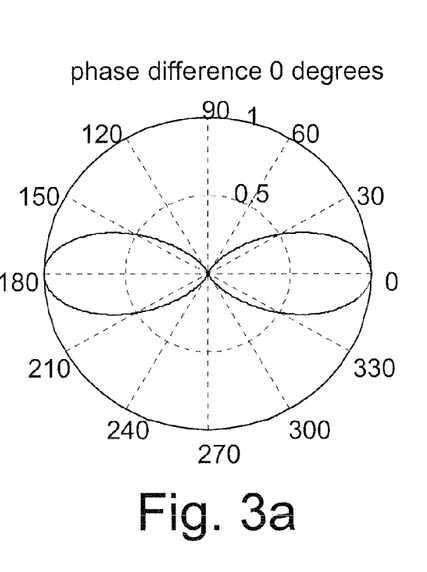
FIGS. 3a, 3b and 3c are diagrams illustrating far-field antenna pattern for a linear equally spaced antenna array with two transmit antennas as a function of different azimuth angles for different relative phase differences between the applied antenna weights.
Figure 3B:
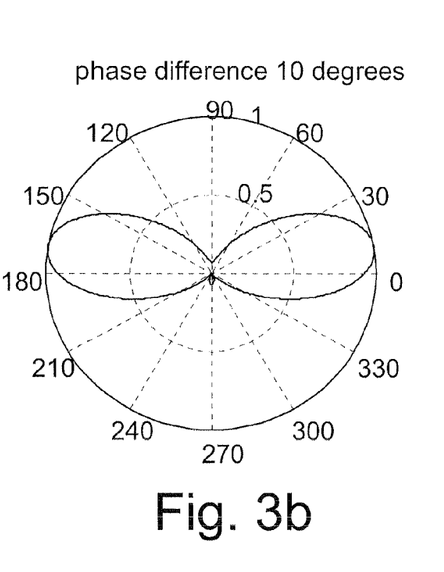
Figure 3C:
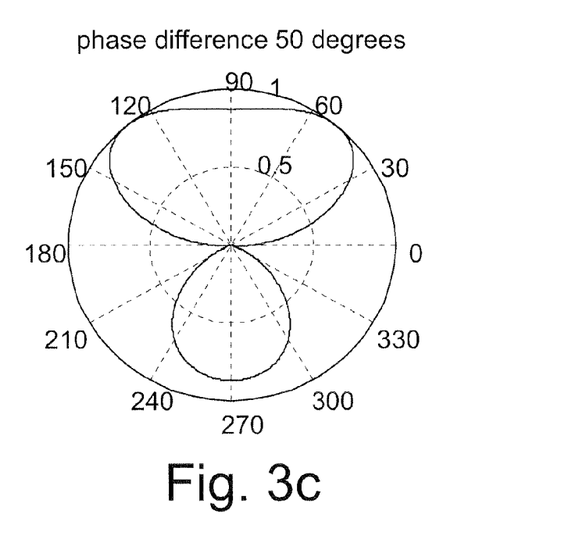

Different exemplary embodiments will be explained and discussed in further detail below, but in order to provide a better understanding for some aspects of the embodiments FIGS. 3a-c will first be explained. FIGS. 3a-c are diagrams illustrating far-field antenna pattern for a linear equally spaced antenna array with two antennas as a function of different azimuth angles when the relative phase difference between the two applied antenna weights are 0, 10 and 50 degrees. As mentioned above the UE can, by applying different complex antenna weights $w_i$, decide the direction in which its energy is radiated, i.e. steer its main beam towards a certain direction. This direction is dependent on the relative phase(s) associated with the transmit antennas, which in turn is decided by the complex antenna weights wi. By applying different antenna weights the UE can thus control the direction of its beam. This is illustrated in FIGS. 3a-c. In FIG. 3a a relative phase difference between the antenna weights of the two transmit antennas is zero degrees, in FIG. 3b the relative phase difference is 10 degrees, and in FIG. 3c the relative phase difference is 50 degrees. From FIGS. 3a-c it can be noted that for a certain angle of departure (azimuth angle) the antenna array gain can vary significantly if the antenna weights are changed so that a 'new' phase difference associated with the two transmit antennas is very different from the 'old', previously used, antenna weights. From FIGS. 3a and 3c it can be seen that if the relative phase differences associated with the 'new' and 'old' antenna weights is large the direction of the beam will be different. The larger the change in relative phase is, the larger the change in the direction of the beam will be. Too large changes in antenna weights will consequently result in that the UE directs its beam and radiated energy in a completely new direction. This can in turn result in a discontinuous jump in the power measured by other Node-Bs. As a reference, it can be noted that in case the transmissions only took place from one antenna the far-field antenna radiation pattern would be isotropic, i.e. the far-field antenna pattern would be independent on the azimuth angle.

Figure 4:
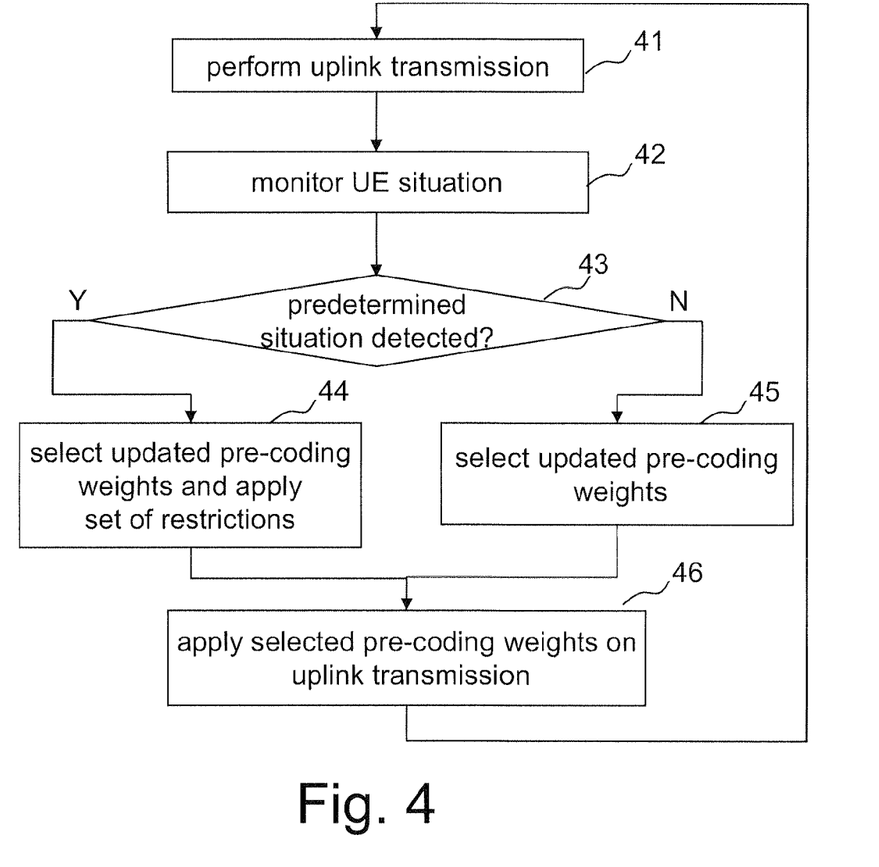
FIG. 4 is a flow diagram illustrating an embodiment of a method in a user equipment for uplink transmit diversity.

FIG. 4 is a flow diagram illustrating an exemplary method in a UE, such as the UE 201 illustrated in FIG. 2. However this exemplary method is not restricted to only UEs in SHO although the way in which some steps of the method are carried out may be influenced if the UE is in SHO. By means of the method it is possible for the UE to identify a predetermined situation and apply a set of restrictions to how the pre-coding weights are updated. Thus the method may allow the UE to identify and avoid making too large changes in the antenna weights it applies in situations where such changes can be harmful for the system performance. By detecting these situations it is possible to restrict the changes in antenna weights.

In a step 41 the UE performs uplink transmission using a first set of pre-coding weights. As part of a process of updating the pre-coding weights, the UE situation is then monitored in a step 42. It is to be noted that this monitoring of the UE situation may be carried out in many different ways. According to some embodiments this step is carried out autonomously by and in the UE. According to other embodiments this monitoring step 42 includes that the UE monitors if any messages indicating the UE situation have been received from a network node. Different options and examples of how and which UE situations may be monitored will be discussed in more detail below. In a step 43 it is determined if one of a predetermined set of situations has been detected.

If it is detected that the user equipment is in one of the predetermined set of situations, a set of restrictions associated with the detected situation is applied when selecting the updated set of pre-coding weights according to step 44. The set of restrictions limits an amount of change between pre-coding weights of the updated set of pre-coding weights and previous pre-coding weights applied for the uplink transmission. Such restrictions can e.g. be specified in terms of:
  a maximum allowed relative phase change between weights applied in a consecutive manner by the UE, or
  a maximum aggregated relative phase change during a time-interval, e.g. the relative phase difference between the pre-coding weights applied in a first slot in a frame m+1 and a frame m should be less than x degrees.

The set of restrictions and the predetermined set of situations could e.g. be signaled to the by the network via RRC signaling or hard-coded in the UE according to a standard specification. The set of restrictions that are applied in the step 44 may be different for different predetermined situations or the same for the whole set of predetermined situations.

If no predetermined situation is detected, updated pre-coding weights may be selected in a step 45 according to any normal pre-coding weight selection procedure without applying any restrictions as in step 44.

The selected updated set of pre-coding weights is applied in a step 46, i.e. uplink transmission is performed using the updated set of pre-coding weights. The method may then be repeated again. However it is to be noted that the set of updated pre-coding weights may be identical to the previous set of pre-coding weights that was used, i.e. no change may have been made to the pre-coding weights. The reason for not changing the pre-coding weights may be that the set of restrictions prevented a change or that there was no need to change the pre-coding weights at this time.

There are many different options for how to select and specify the set of pre-determined situations that are to be monitored in the step 42. The situations and criteria that are monitored should be chosen such that situations where it may be beneficial to restrict the changes in applied antenna weights are identified. Some examples of situations and criteria that may be monitored in the step 42 will now be discussed in the following:

It may be monitored in the step 42 if the UE's serving or scheduled grant exceeds a predetermined threshold value and the set of restrictions may be applied in the step 44 if this is the case. As the transmit power used by the UE increases with its serving grant, UEs with a high serving grant will (all else equal) generate the most inter-cell interference. By monitoring this criterion, i.e. the serving grant of the UE, it can be identified if the UE is among those UEs that are likely to generate the most inter-cell interference. By further restricting the UE from changing its antenna weights potentially abruptly, discontinuities in the inter-cell interference can be avoided. Note that this constraint moreover could be beneficial from a performance point of view in situations where the non-serving Node-Bs has allocated a limited amount of hardware resources for decoding E-DPDCH associated with UEs in SHO, which implicitly restricts the maximum rate that it can support. The predetermined threshold value could be signaled to the UE via RRC or could be hard-coded in the UE according to a standard specification. The set of restrictions with respect to antenna weights could be applied until the serving grant is reduced bellow another possibly smaller predetermined threshold value.

Alternatively or additionally it may be monitored in the step 42 if the UE has received an overload indicator from a non-serving cell. Typically non-serving cells send an overload indication to a UE in SHO if their currently measured RoT level is so high so that, e.g. the random access coverage of the cells is endangered. Hence if the UE receives an overload indication from a non-serving cell this is a signal that a, only slightly higher interference level experienced by the cell transmitting the overload indicator may cause severe performance degradation in terms of reduced uplink coverage for UEs in that cell. Accordingly it may be beneficial to restrict the changes in applied antenna weights of the UE has received an overload indication.

Alternatively or additionally it may be monitored in the step 42 if the UE is in soft handover. It may be beneficial to apply restrictions to how pre-coding weights are updated as soon as it is detected that the UE is in soft handover even if no overload indication has been received. However, the set of restrictions that are applied when no overload indication has been received may be optionally be less restrictive than the set of restrictions that are applied when an overload indications has been received.

Different exemplary embodiments could use combinations of the exemplary criteria listed above to specify additional exemplary predetermined situations.

Figure 5:
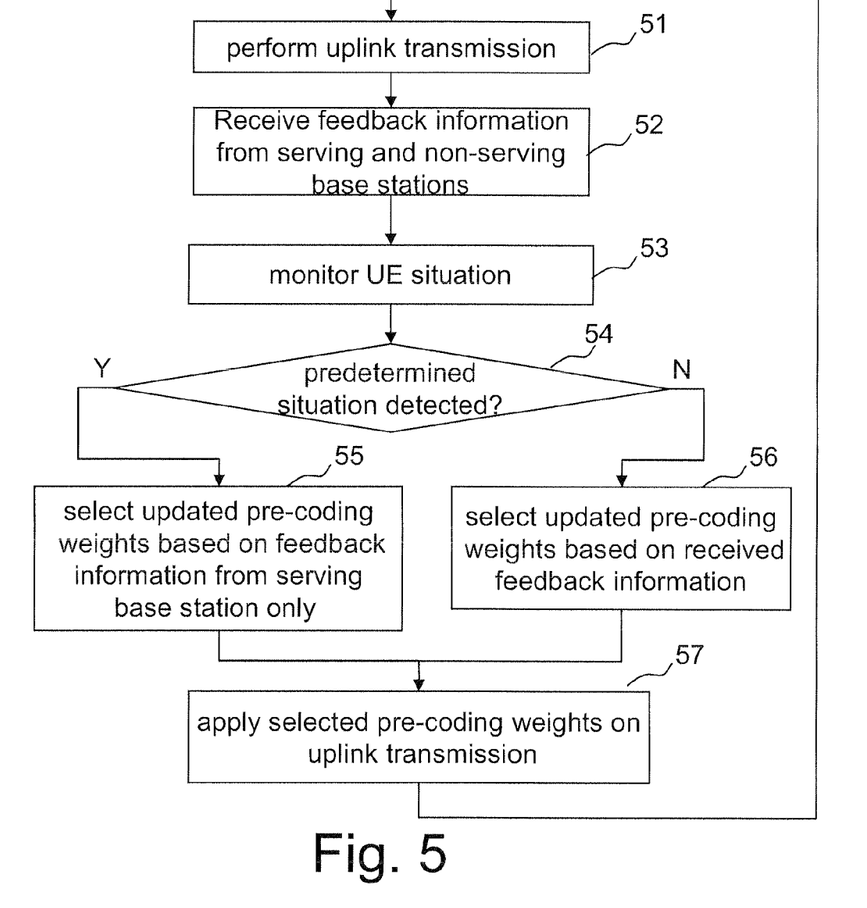
FIG. 5 is a flow diagram illustrating an alternative embodiment of a method in a user equipment for uplink transmit diversity.

FIG. 5 is a flow diagram illustrating another exemplary method in a UE, such as the UE 201 illustrated in FIG. 2. This exemplary method applies to UEs in SHO. By means of the method it is possible for the UE to identify a predetermined situation and only consider feedback information from the serving base station when choosing antenna weights. Thus, for the purpose of updating antenna weights, feedback information from some base stations of the UEs active set may be ignored. Thus the method may allow the UE steer its beam towards the serving base station instead of towards a non-serving base station.

In a step 51 the UE perform uplink transmission using a first set of pre-coding weights. The UE receives feedback information from base stations in its active set, both the serving base station and non serving base station(s) in a step 52. As part of a process of updating the pre-coding weights, the UE situation is then monitored in a step 53. It is to be noted that this monitoring of the UE situation may be carried out in many different ways. According to some embodiments this step is carried out autonomously by and in the UE. According to other embodiments this monitoring step 53 includes that the UE monitors if any messages indicating the UE situation have been received from a network node. Different options and examples of how and which UE situations may be monitored will be discussed in more detail below. In a step 54 it is determined if one of a predetermined set of situations has been detected.

If it is detected that the user equipment is in one of the predetermined set of situations, only the feedback information that has been received from the serving base station is considered when selecting the updated set of pre-coding weights according to step 55. Accordingly the feedback information that has been received from any non-serving base station is not considered when selecting the updated set of pre-coding weights. This will avoid that the UE steers its beam towards any non-serving base station instead of the serving base station and will thus help to e.g. ensure that the HS-DPCCH coverage is sufficient to allow decoding in the serving base station.

If no predetermined situation is detected, updated pre-coding weights may be selected in a step 56 according to any normal pre-coding weight selection procedure based on received feedback information from any of the base stations in the active set.

The selected updated set of pre-coding weights is applied in a step 57, i.e. uplink transmission is performed using the updated set of pre-coding weights. The method may then be repeated again.

There are many different options for how to select and specify the set of pre-determined situations that are to be monitored in the step 53. The situations and criteria that are monitored should be chosen such that situations where there is a risk that the UE directs its beam towards a non-serving base station are identified. Some examples of situations and criteria that may be monitored in the step 53 will now be discussed in the following:

According to one exemplary embodiment it is simply monitored if the UE is in SHO or not in the step 53. If the UE is in soft handover it should only consider feedback information from the serving cell when selecting antenna weights according to step 55. This would ensure that the UE base the selection of antenna weights on the performance that is achieved at the serving Node-B for example by steering the beam towards this cell. As a sufficient amount of hardware resources only can be guaranteed in the serving Node-B, since the serving cell transmits the scheduled grant, and HS-DPCCH only is received by the serving Node-B ensuring that UE steers its beam towards the serving cell can be beneficial.

It may alternatively be monitored in the step 53 if the scheduled grant exceeds a predetermined threshold value. If the scheduled grant exceeds the predetermined threshold value, the step 55 may be performed; if not the step 56 may be performed. This would allow the network to limit the amount of hardware resources that is allocated in non-serving cells. At the same time it ensures that UE, when utilizing a high grant, steers its beam towards the serving Node-B where hardware resources exists. The predetermined threshold value could be configurable via RRC or hard-coded in the UE, Alternatively or additionally it may be monitored in the step 53 if a predetermined relative number of negative acknowledgement indications have been received from the serving base station. This criterion may in particular be specified as perform step 55 if X out of the last Y (where X≤Y) E-HICH receptions correspond to 'NACK'. Here X and Y could be configurable via RRC signaling or hard-coded into the UE. A large relative number of negative acknowledgements from the serving base station may be an indication that the UE has directed its beam towards a non-serving base station instead of towards the serving base station. This criterion might also be combined with an investigation of the amount of positive acknowledgments received from a non-serving base station. If the UE receives a large relative number of NACKs from a serving base station while at the same time receiving a large relative number of ACKs from a non-serving base station, this would be a very strong indication that the UE has its beam directed towards the non-serving base station instead of towards the serving base station.

It can also be monitored in the step 53 if any indication of inferior uplink coverage of HS-DPCCH could be detected. An example of such an indication is when a fraction of already successfully received packets, i.e. where the UE has transmitted an ACK on HS-DPCCH, that the serving Node-B retransmit on HS-DSCH exceeds a threshold. Thus it may be monitored in the step 53 if a predetermined relative number of retransmissions of packets, for which the UE has transmitted an acknowledgement, have been received. A poor HS-DPCCH quality could cause unnecessary retransmissions on Layer 1 and Radio Link Control (RLC) layer, and also reduce the quality of Channel Quality Indicator (CQI) reports. Both these aspects are likely to reduce the experienced downlink data rates.

Different exemplary embodiments could use combinations of the exemplary criteria listed above to specify additional exemplary predetermined situations.

As mentioned above the monitoring steps 42 and 53 illustrated in FIGS. 4 and 5 respectively may include that the UE monitors if any messages indicating the UE situation have been received from a network node. Accordingly a network node such as the RNC 206 and/or a base station such as the Node-B 202 or 204 may be configured to detect if the UE is in one of the predetermined situations. The situations that may be detected by different network node may depend on the type of network node and may differ from the situations that may be detected by the UE due to the fact that different types of information are available in different types of nodes. According to different embodiments the network node may be configured to:

identify situations where open loop beam forming can be harmful; either for the system performance or for the performance of the individual UE, and restrict the UE from making too abrupt changes in the antenna pre-coding weights under such circumstances. This network support for triggering careful pre-coding weight selection in the UE may be implemented in e.g. the RNC, the base station, such as the Node-B, or in a distributed fashion where part of the functionality resides in the RNC and part of the functionality resides in the base station.

Figure 6:
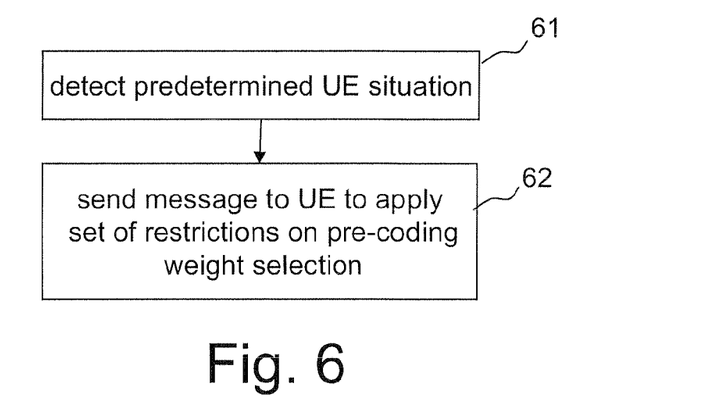
FIG. 6 is a flow diagram illustrating an embodiment of a method in a network node for supporting uplink transmit diversity in a user equipment.

FIG. 6 is a flow diagram illustrating an exemplary embodiment of a method in a network node, such as the RNC 206 or the Node-B 202 or 204. In a step 61 the network node detects if the UE is currently in one of a predetermined set of situations. If the UE is detected to be in one of the predetermined set of situations, the network node sends a message to the UE, in a step 62, to notify the UE to apply a set of restrictions associated with the detected situation when selecting an updated set of pre-coding weights for uplink transmission. The set of restrictions limits an amount of change between pre-coding weights of the updated set of pre-coding weights and previous pre-coding weights applied for the uplink transmission.

Assuming that the exemplary method illustrated in FIG. 6 is implemented in the serving and/or non-serving Node-B(s) and that it is desired to detect situations where it may be beneficial to restrict the changes in applied antenna/pre-coding weights, the following criteria or combinations of criteria may be used to specify the set of predetermined situations and to trigger that the step 62 is performed:

The serving Node-B has issued a scheduled grant that exceeds a predetermined first threshold value.

The serving Node-B detects that the UE use an Enhanced Dedicated Channel-Transport Format Combination Identifier (E-TFCI) that exceeds a predetermined second threshold value. Unlike a criteria that only considers the scheduled grant this enable the serving Node-B to also consider the grant utilization, i.e. the amount of data transmitted by the UE. Note that this requires that the serving Node-B can decode the E-DCH Dedicated Physical Control Channel (E-DPCCH).

The serving Node-B has issued a scheduled grant that exceeds a predetermined third threshold value and the UE has reported a Total E-DCH Buffer Status (TEBS) value that exceeds a predetermined fourth threshold value. The TEBS is reported in the scheduling information (SI) information and it is used to indicate how much data that the UE has in its E-DCH buffer.

The serving Node-B detects that the uplink power headroom (UPH) reported by the UE exceeds a predetermined fifth threshold value. The UPH can be used to identify whether or not a UE is close to the cell border. Note that the closer a UE is to the cell border the more inter-cell interference it will generate.

The serving Node-B detects that the channel quality information (CQI) is below a predetermined sixth threshold value. Note that a small CQI value indicates that the UE is close to the cell border and thus is a significant contributor to the inter-cell interference.

The serving Node-B can evaluate the grant utilization combined with the knowledge about the UE buffer status this is e.g. available in the TEBS in the SI or the happy bit transmitted on E-DPCCH).

A non-serving Node detects that an estimate of the inter-cell interference exceeds a predetermined seventh threshold value. This indicates that there is at least one UE that generates a significant level of inter-cell interference.

The non-serving Node-B could look at the E-TFCI of the UEs in SHO. Also this indicates how much inter-cell interference a particular UE is generating.

Given that one or several of the above criteria are met for the serving or non-serving Node-B, the serving or non-serving Node B can transmit a L1 signal to the UE restricting how frequently and abruptly pre-coding weight changes are allowed. Note that as one extreme the signal could imply that the UE only is allowed to transmit from one antenna or that it is not allowed to update its pre-coding weights at all. One example of such an L1 signal could be a High-Speed Shared Control Channel (HS-SCCH) order. The different predetermined threshold values referred to in the listed criteria above are numbered merely to differentiate between them. Different of the predetermined threshold values may be used in different embodiments.

Assuming that the exemplary method illustrated in FIG. 6 is implemented in the RNC and that it is desired to detect situations where it may be beneficial to restrict the changes in applied antenna/pre-coding weights, the following criteria or combinations of criteria may be used to specify the set of predetermined situations and to trigger that the step 62 is performed:

The RNC detects an Event 1*a* or an Event 1*b*. These events have already been defined by 3GPP and they indicate that a new neighboring Node-B is entering/leaving the reporting range for the UE. Note that associated thresholds can be set to different values for the different events.

The RNC detects that the UE should be reconfigured so that its active set contains multiple NodeBs, i.e. it should enter in SHO state.

The RNC detects an Event 6*a* or an Event 6*b*. These events have already been defined by 3GPP and they indicate that a filtered UE transmit power exceeds/is below associated predefined thresholds for the UE. Note that the predefined thresholds can be set to different values for the different events.

Aside from these events the eight exemplary criteria mentioned above in the context where they were only used by the Node-B can also be used in an RNC implementation. Since this information typically only is known by the Node-Bs new signaling over the Iub interface, from the Node-Bs to the serving RNC, would have to be introduced so that the information could be conveyed to the serving RNC. Upon detecting that one or several of these criteria are fulfilled the RNC could reconfigure the UE via RRC so that it only is allowed to transmit from one antenna or so that the UE is not allowed to make too frequent and/or rapid updates to its pre-coding vectors.

Figure 7:
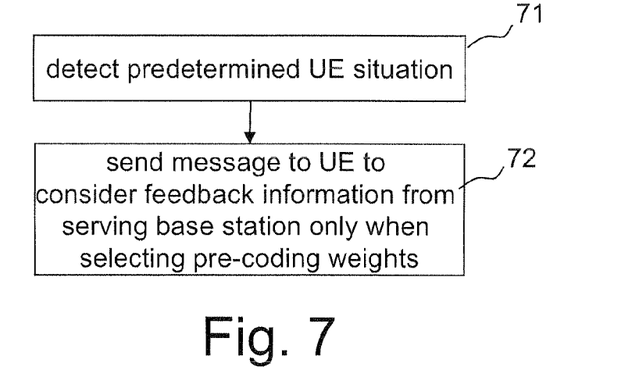
FIG. 7 is a flow diagram illustrating an alternative embodiment of a method in a network node for supporting uplink transmit diversity in a user equipment.

FIG. 7 is a flow diagram illustrating another exemplary embodiment of a method in a network node, such as the RNC 206 or the Node-B 202 or 204. This exemplary method is applicable to support uplink transmit diversity in a UE that is in SHO and is receiving feedback information from a serving base station and a number of non-serving base stations. In a step 71 the network node detects if the UE is currently in one of a predetermined set of situations. If the UE is detected to be in one of the predetermined set of situations, the network node sends a message to the UE, in a step 72, to notify the UE to only consider the feedback information that has been received from the serving base station when selecting an updated set of pre-coding weights for uplink transmission.

Assuming that the exemplary method illustrated in FIG. 7 is implemented in the serving and/or non-serving Node-B(s) and that it is desired to detect situations in which the UE in SHO has an inferior link towards its serving Node-B, the following criteria can be used to specify the set of predetermined situations and to trigger that the step 72 is performed:

The serving Node-B detects an indication of inferior uplink coverage of HS-DPCCH. An example of such an indication is when the serving Node-B fails to detect an HARQ-ACK message transmitted on the HS-DPCCH even through it has transmitted a packet in the downlink. If the fraction of missed HARQ-ACK transmissions exceeds a threshold, this can be interpreted as an indication that the signal quality of HS-DPCCH is inferior. In other words the step 72 may be triggered if the Node-B fails to detect a predetermined relative number of acknowledgement messages on the HS-DPCCH corresponding to a number of packets that the Node-B has transmitted to the UE.

The serving Node-B fails to detect a CQI in a time-slot where a CQI should have been transmitted by the UE. If the fraction of missed CQI transmissions exceeds a threshold, this can be interpreted as an indication that the signal quality of HS-DPCCH is inferior. In other words, the step 72 may be triggered if the Node-B fails to detect a predetermined relative number of channel quality indicators in a number of time-slots where a channel quality indicator was expected from the UE.

The serving Node-B has sent a predetermined relative number of negative acknowledgement indications to the UE. If for instance 'M' out of the last 'N' (where M≤N) HARQ-ACK transmissions on E-HICH from the serving Node-B corresponds to NACK, this can be interpreted as an indication that the UE is power-controlled by a non-serving Node-B and that the link towards the serving Node-B is inferior.

The difference between a measured DPCCH SIR at the serving Node-B and the SIR target exceeds a predefined first threshold for a pre-defined time duration. This can be interpreted as an indication that the UE is power controlled by the non-serving Node-B and that link towards the serving Node-B is inferior.

If the fraction of transmit power control, TPC, UP commands transmitted on a Fractional Dedicated Physical Channel (F-DPCH) exceeds a predefined second threshold, also this can be viewed as an indication that the UE is power-controlled by the non-serving Node-B and that the link towards the serving Node-B is inferior.

Upon fulfillment of one or several of the above mentioned criteria the serving Node-B could transmit a L1 signal to the UE indicating that it only should consider feedback information from the serving Node-B when selecting its pre-coding weights. Optionally the L1 signal could also indicate to the UE is only allowed to transmit from one antenna or that the UE is not allowed to make too frequent and/or too abrupt changes to the applied pre-coding weights. One example of such a L1 signal is an HS-SCCH order.

Assuming that the exemplary method illustrated in FIG. 7 is implemented in the RNC and that it is desired to detect situations in which the UE in SHO has an inferior link towards its serving Node-B, the following criteria can be used to specify the set of predetermined situations and to trigger that the step 72 is performed:

The fraction of successful uplink packets from the serving Node-B is smaller than a certain threshold. This is an indication of that the uplink towards the serving Node-B is weaker than the link towards the non-serving Node-B.

The probability of downlink RLC retransmissions exceeds a predetermined third threshold. This is an indication that the HS-DPCCH quality is inferior. Too weak HS-DPCCH quality may result in that the serving Node-B misinterprets NACK as ACKs, and fails to detect HARQ-ACK transmissions even though the UE has transmitted an ACK/NACK. Both of these results will in the end increase the fraction of RLC retransmissions.

Aside from the above mentioned criteria, the five exemplary criteria mentioned above in the context where they were only used by the serving Node-B can also be used in an RNC implementation. This would however require Iub signaling.

Given that the RNC has detected that a UE experiences a weak uplink towards its serving Node-B it could reconfigure the UE via RRC signaling or notify the serving Node-B over Iub, which could forward the message to the UE via L1 signaling (e.g. an HS-SCCH order). The signal from the RNC could imply that the UE only should consider feedback information from the serving Node-B when selecting pre-coding weights. Optionally the signal from the RNC could also indicate that the UE only should transmit from one of the antennas or that the UE is to apply restrictions on how the pre-coding weights are updated.

Figure 8:
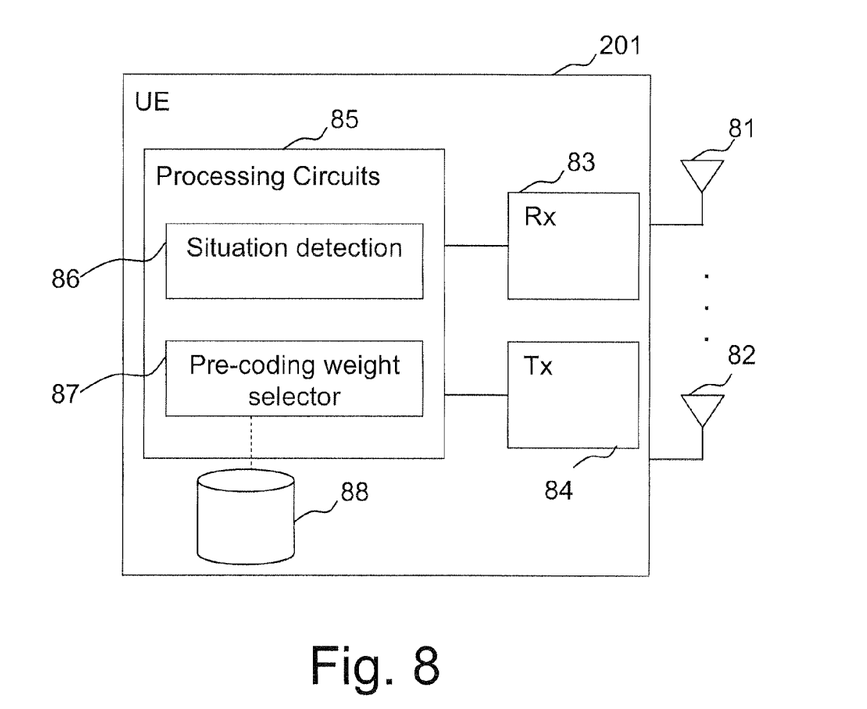
FIG. 8 is a schematic block diagram illustrating an embodiment of a user equipment configured for uplink transmit diversity.

FIG. 8 is a schematic block diagram of an exemplary embodiment of a UE 201 that is adapted to perform the method according to FIG. 4 or FIG. 5. As illustrated in FIG. 8, the UE 201 comprises a primary antenna 81 and a secondary antenna 82, but the UE 201 may also comprise further antennas. The UE includes receiver circuits 83 and transmitter circuits 84. Alternatively the receiver and transmitter circuits may be integrated in a transceiver unit. The transmitter circuits 84 and antennas 81, 82 are particularly configured to perform the steps 41 and 46 of FIG. 4 or the steps 51 and 57 of FIG. 5. The receiver circuits 83 and the antennas 81, 82 are also configured for step 52 of FIG. 5. Processing circuits 85 are provided. According to the illustrated exemplary embodiment the processing circuits 85 comprise a situation detection unit 86, adapted to perform the steps 42 and 43 of FIG. 4 or the steps 53 and 54 of FIG. 5, and a pre-coding weight selector 87, adapted to perform the steps 44 and 45 of FIG. 4 or the steps 55 and 56 of FIG. 5. The processing circuits 85 may be embodied in the form of one or more programmable processors programmed to perform the previously mentioned steps. However, any data processing circuits or combination of different types of processing circuits that is capable of performing the mentioned steps could be used. The UE 201 may also be provided with a memory unit 88 which is adapted to e.g. store information related to predetermined situations to be monitored and any associated restrictions to be applied if the corresponding pre-determined situation is detected.

Figure 9:
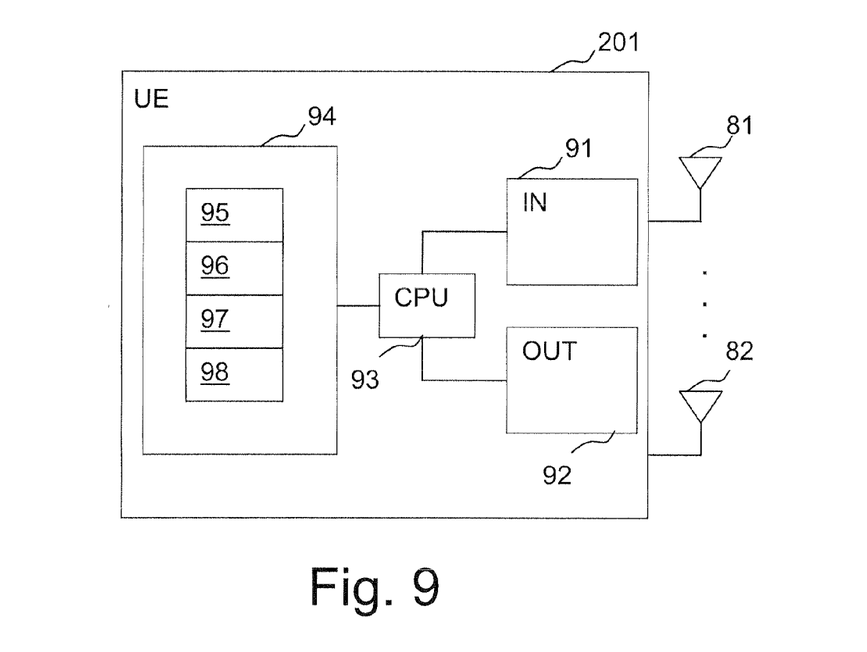
FIG. 9 is a schematic block diagram illustrating an alternative embodiment of a user equipment configured for uplink transmit diversity.

FIG. 9 is a schematic block diagram of another exemplary embodiment of the UE 201. FIG. 9 may be an alternative description of the exemplary embodiment shown in FIG. 8. The UE 201 comprises antennas 81 and 82. The UE 201 also comprises an input unit 91 which is adapted to receive downlink signals and an output unit 92 for output of uplink signals. The input unit 91 and the output unit 92 may be integrated in hardware of the UE 201. The UE 201 is furthermore provided with a CPU 93, which may be a single unit or composed of several units that are configured to perform steps of procedures described herein. At least one computer program product 94 is included in the UE 201. The computer program product 94 may be embodied in the form of a volatile or non-volatile memory, e.g. a RAM, an EEPROM, a flash memory or a disc drive. The computer program product 94 comprises computer program submodules. FIG. 9 shows a situation detection submodule 95 for assisting in monitoring and detecting if the UE 201 is in one of the set of predetermined situations, a pre-coding weight selection submodule 96 for controlling selection and updating of the pre-coding weights for uplink transmission, a receive submodule 97 for assisting in reception of downlink signals, and a transmit submodule 98 for assisting in transmission of uplink signals. The submodules 95-98 essentially perform the steps 41-46 of the flow diagram of FIG. 4, or the steps 51-57 of the flow diagram of FIG. 5. In other words, when the different submodules 95-98 are run on the CPU 93, the UE 201 performs the steps 41-46 illustrated in FIG. 4 or the steps 51-57 of the flow diagram of FIG. 5. The submodules 95-98 would generally be implemented in software, although implementations completely or partly in firmware, hardware or combinations thereof are also feasible.

From the description above it is apparent that an advantage of some embodiments described above is that they improve the possibilities of providing sufficient HS-DPCCH coverage for a UE that applies transmit diversity. This is achieved by avoiding steering the beam of the UE towards a non-serving base station instead of towards the serving base station.

Another advantage of some of the embodiments presented herein is that it is made possible for the network to ensure that the UE select antenna weights both considering available air and hardware resources. This is achieved by ensuring that the UE steers its beam primarily towards the serving base station since the serving base station allocates hardware resources in relation to the scheduled grants that it issues to the UE.

Yet another advantage of some of the embodiments presented herein is that it can be avoided that the UE change its antenna weights in situations or in a way that result in detrimental interference in surrounding cells. Thus it may be ensured that the UE only change its antenna weights in situations where the non-serving or surrounding cells are likely to be capable of handling increased interference.

A further advantage is that the embodiments above may be used in connection with different uplink transmit diversity techniques. Examples of different uplink transmit diversity techniques are switched antenna diversity and beam forming.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for uplink transmit diversity in a user equipment of a High-Speed Packet Access (HSPA) communications system, the method comprising:
performing uplink transmission using a first set of pre-coding weights;
selecting an updated set of pre-coding weights for continuing the uplink transmission, wherein the selection of the updated set of pre-coding weights includes:
detecting if the user equipment is currently in one of a predetermined set of situations including one or a combination of the following:
a situation where a serving grant of the user equipment exceeds a predetermined threshold value,
a situation where the user equipment is in a soft handover state, and
a situation where the user equipment is in a soft handover state and has received an overload indication from a non-serving cell; and
if the user equipment is detected to be in one of the predetermined set of situations, applying a set of restrictions associated with the detected situation when selecting the updated set of pre-coding weights, wherein the set of restrictions limits an amount of change between pre-coding weights of the updated set of pre-coding weights and previous pre-coding weights applied for the uplink transmission; and
performing uplink transmission using the selected updated set of pre-coding weights,
wherein the set of restrictions specifies a maximum relative pre-coding weight phase change during a time interval, and
wherein the user equipment applies switched antenna diversity for the uplink transmission and the set of restrictions specifies that the user equipment is restricted from switching antenna for the uplink transmission.

2. The method according to claim 1, wherein the set of restrictions specifies a maximum allowed relative phase change between the pre-coding weights of the updated set of pre-coding weights and the pre-coding weights of the first set of pre-coding weights.

3. The method according to claim 1, wherein said detection of the user equipment being in one of the predetermined set of situations includes receiving a message from a network node indicating that one of the predetermined set of situations has been detected, and wherein the set of restrictions is applied when selecting the updated set of pre-coding weights in response to the reception of the message from the network node.

4. A user equipment for use in a High-Speed Packet Access (HSPA) communications system supporting uplink transmit diversity, the user equipment comprising:
a plurality of antennas for uplink and downlink transmission, wherein the user equipment is configured to:
perform uplink transmission using a first set of pre-coding weights;
select an updated set of pre-coding weights for continuing the uplink transmission, wherein the user equipment is configured to select the updated set of pre-coding weights by:

detecting if the user equipment is currently in one of a predetermined set of situations including one or a combination of the following:
a situation where a serving grant of the user equipment exceeds a predetermined threshold value,
a situation where the user equipment is in a soft handover state, and
a situation where the user equipment is in a soft handover state and has received an overload indication from a non-serving cell; and
if the user equipment is detected to be in one of the predetermined set of situations, applying a set of restrictions associated with the detected situation when selecting the updated set of pre-coding weights, wherein the set of restrictions limits an amount of change between pre-coding weights of the updated set of pre-coding weights and previous pre-coding weights applied for the uplink transmission; and
perform uplink transmission using the selected updated set of pre-coding weights,
wherein the set of restrictions specifies a maximum relative pre-coding weight phase change during a time interval, and
wherein the user equipment is configured to apply switched antenna diversity for the uplink transmission and wherein the set of restrictions specifies that the user equipment is restricted from switching antenna for the uplink transmission.

5. The user equipment according to claim 4, wherein the set of restrictions specifies a maximum allowed relative phase change between the pre-coding weights of the updated set of pre-coding weights and the pre-coding weights of the first set of pre-coding weights.

6. The user equipment according to claim 4, wherein the user equipment is configured to detect that the user equipment is in one of the predetermined set of situations by receiving a message from a network node indicating that one of the predetermined set of situations has been detected, and wherein the user equipment is configured to apply the set of restrictions when selecting the updated set of pre-coding weights in response to the reception of the message from the network node.

7. A method in a network node of a High-Speed Packet Access (HSPA) communications system for supporting uplink transmit diversity in a user equipment of the High-Speed Packet Access (HSPA) communications system, the method comprising:
detecting if the user equipment is currently in a predetermined set of situations, and
if the user equipment is detected to be in one of the predetermined set of situations, sending a message to the user equipment to notify the user equipment to apply a set of restrictions associated with the detected situation when selecting an updated set of pre-coding weights for uplink transmission,
wherein the set of restrictions limits an amount of change between pre-coding weights of the updated set of pre-coding weights and previous pre-coding weights applied for the uplink transmission, and wherein the predetermined set of situations includes the following situations:
a situation where it is detected that a new neighboring base station is entering a reporting range for the user equipment or that a neighboring base station is leaving a reporting range for the user equipment,
a situation where the user equipment is to be configured in a soft handover state, and
a situation where it is detected that a filtered transit power of the user equipment exceeds a predetermined eighth threshold value for the user equipment or is below a predetermined ninth threshold value for the user equipment.

8. The method according to claim 7, wherein the network node is a radio network controller.

9. A network node for use in a High-Speed Packet Access (HSPA) communications system supporting uplink transmit diversity, wherein the network node comprising:
a controller configured to detect if a user equipment of the wireless communication system is currently in a predetermined set of situations, and
a transmitter configured, if the user equipment is detected by the controller to be in one of the predetermined set of situations, to send a message to the user equipment to notify the user equipment to apply a set of restrictions associated with the detected situation when selecting an updated set of pre-coding weights for uplink transmission,
wherein the set of restrictions limits an amount of change between pre-coding weights of the updated set of pre-coding weights and previous pre-coding weights applied for the uplink transmission, and
the predetermined set of situations includes a situation where an estimate of inter-cell interference exceeds a predetermined threshold value and one or a combination of the following additional situations:
a situation where the base station has issued a scheduled grant for the user equipment that exceeds a predetermined first threshold value,
a situation where the base station detects that the user equipment uses an Enhanced Dedicated Channel-Transport Format Combination Identifier that exceeds a predetermined second threshold value,
a situation where the base station has issued a scheduled grant for the user equipment that exceeds a predetermined third threshold value and the user equipment has reported a total Enhanced Dedicated Channel buffer status value to the base station that exceeds a predetermined fourth threshold value,
a situation where the base station detects that an uplink power headroom reported by the user equipment exceeds a predetermined fifth threshold value, and
a situation where the base station detects that a channel quality information value reported by the user equipment is below a predetermined sixth threshold value.

10. The network node according to claim 9, wherein the network node is a base station.

* * * * *